United States Patent [19]

Pinto

[11] Patent Number: 4,725,381
[45] Date of Patent: Feb. 16, 1988

[54] HYDROGEN STREAMS

[75] Inventor: Alwyn Pinto, Middlesbrough, England

[73] Assignee: Imperial Chemical Industries PLC, London, England

[21] Appl. No.: 894,113

[22] Filed: Aug. 7, 1986

Related U.S. Application Data

[63] Continuation-in-part of Ser. No. 703,531, Feb. 20, 1985, Pat. No. 4,695,442, and a continuation-in-part of Ser. No. 868,666, May 30, 1986, which is a continuation-in-part of Ser. No. 703,531, Feb. 20, 1985.

[30] Foreign Application Priority Data

| Mar. 2, 1984 | [GB] | United Kingdom | 8405591 |
| Jul. 4, 1984 | [GB] | United Kingdom | 8417016 |
| Jul. 4, 1984 | [GB] | United Kingdom | 8417017 |
| Oct. 9, 1984 | [GB] | United Kingdom | 8425508 |
| Jun. 4, 1985 | [GB] | United Kingdom | 8513997 |
| Jun. 18, 1985 | [GB] | United Kingdom | 8515392 |
| Aug. 7, 1985 | [GB] | United Kingdom | 8519821 |

[51] Int. Cl.$^4$ .............................. C01B 3/26
[52] U.S. Cl. ...................... 252/376; 252/373; 252/374; 252/375; 252/377; 423/359; 423/655
[58] Field of Search ................ 252/373, 374, 375, 376, 252/377; 423/359, 655

[56] References Cited

U.S. PATENT DOCUMENTS

| 4,409,196 | 10/1983 | Skinner et al. | 423/359 |
| 4,414,191 | 11/1983 | Fuderer | 423/359 |
| 4,512,780 | 4/1985 | Fuderer | 55/26 |
| 4,553,981 | 11/1985 | Fuderer | 423/359 |
| 4,592,860 | 6/1986 | Fuderer | 252/376 |

Primary Examiner—John Doll
Assistant Examiner—Wayne A. Langel
Attorney, Agent, or Firm—Cushman, Darby & Cushman

[57] ABSTRACT

A carbonaceous feedstock, e.g. coal or heavy oil, having a low hydrogen to carbon atomic ratio is partially oxidized using air, or oxygen enriched or depleted air, to form a crude gas which is subjected to catalytic shift and excess steam removal. Carbon dioxide and nitrogen are then removed from the resultant raw gas, which has a hydrogen to nitrogen, plus carbon monoxide, volume ratio in the range 0.5 to 1.5 and a nitrogen content at least 10 times the carbon monoxide content, in a pressure swing adsorption process thereby producing a product gas stream containing at least 50% hydrogen and 0.5 to 40% nitrogen, by volume. The waste gas from the pressure swing adsorption may be catalytically combusted to power a turbine driving the compressor for the air or the crude gas.

10 Claims, 1 Drawing Figure

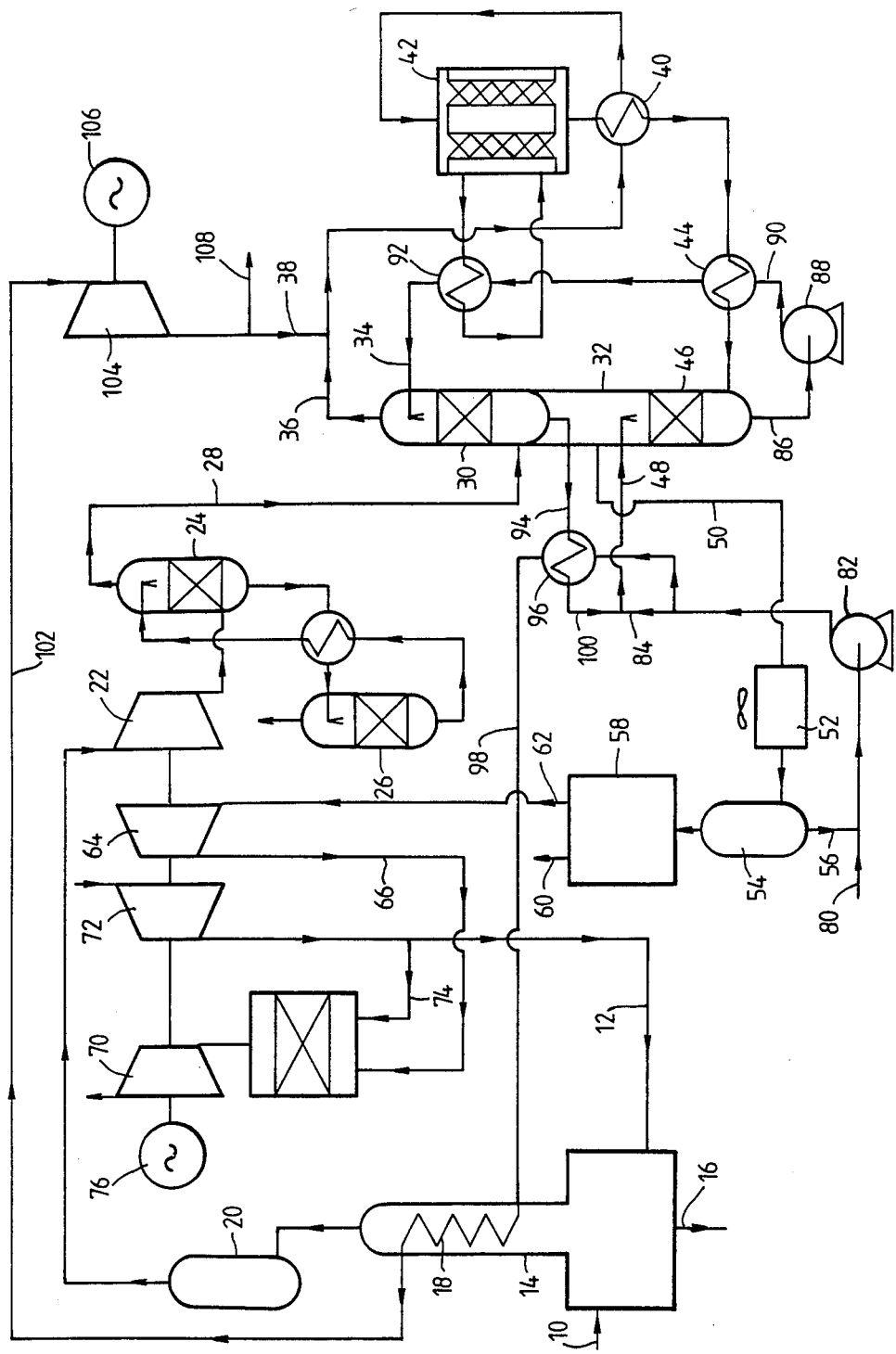

HYDROGEN STREAMS

This application is a continuation-in-part of application Ser. No. 703,531 filed Feb. 20, 1985, now U.S. Pat. No. 4,695,442, entitled "Hydrogen" and of application Ser. No. 868666 filed May 30, 1986 entitled "Technical hydrogen", which itself is a continuation-in-part of the aforesaid application Ser. No. 703531, now U.S. Pat. 4,695,442.

This invention relates to the production of hydrogen streams containing at least 50% by volume of hydrogen from carbonaceous feedstocks, such as coal or heavy oil, having a hydrogen to carbon atomic ratio below 2. Such hydrogen streams are of use for hydrogenation reactions and, when containing an appropriate proportion of nitrogen, for use as ammonia synthesis gas.

Such gas streams are commonly made by reacting the feedstock with high purity oxygen, and also possibly steam, to produce a crude gas containing hydrogen and carbon oxides, followed by subjecting the crude gas to catalytic shift reaction with steam to convert carbon monoxide to carbon dioxide, with the concurrent production of more hydrogen. Any excess of steam is then removed and the shifted gas is then subjected to a wet carbon dioxide removal process before fine purification by methanation or by washing with liquid nitrogen.

One disadvantage of such a process is the cost of the air separation plant required to produce the high purity oxygen used for the reaction with the feedstock. Where nitrogen is desired in the product, e.g. for ammonia synthesis gas, this has been obtained from the air separation plant.

It has also been proposed to employ air in place of high purity oxygen for the reaction with the feedstock, e.g. "air mode" partial oxidation processes. However the gas produced by such an air mode partial oxidation has previously been considered to be too rich in nitrogen to be of use for the economic manufacture of gas streams containing a large proportion of hydrogen. Rather such air mode partial oxidation processes have been developed to provide "clean" fuel for gas turbines.

In the present invention a pressure swing adsorption (PSA) process is employed in place of the wet carbon dioxide removal process. We realised that the raw gas fed to the PSA system can contain a considerable proportion of nitrogen, without causing serious inefficiency, if the PSA process is operated so that nitrogen is allowed to break-through into the unadsorbed, hydrogen containing, product stream. As a result the initial reaction of the feedstock can be effected with air, or very moderately oxygen enriched air, or evey oxygen depleted air. Although the waste gas stream from the PSA system is of very low calorific value, its fuel value can be recovered, e.g. by catalytic combustion, and it is possible to design an energy balanced process.

Accordingly the present invention provides a process for the production of a gas stream containing at least 50% by volume of hydrogen comprising
 (a) subjecting a carbonaceous feedstock having a hydrogen to carbon atomic ratio, on an anhydrous basis, of less than 2.2 to partial oxidation with an oxygen/nitrogen mixture containing 15 to 35% oxygen and selected from air, oxygen depleted air, and oxygen enriched air, so as to produce a crude gas containing hydrogen, carbon oxides, and nitrogen;
 (b) subjecting the crude gas to catalytic shift reaction with steam to convert carbon monoxide to carbon dioxide;
  the proportions of the reactants, and the process conditions, in the partial oxidation and shift stages being such that the resultant shifted gas stream has
  a nitrogen content at least 10 times the carbon monoxide content, by volume, and
  a volume ratio of hydrogen to nitrogen, plus carbon monoxide, in the range 0.5 to 1.5;
 (c) cooling the shifted gas stream to condense any excess of steam to produce a raw gas stream; and
 (d) subjecting the raw gas stream to a pressure swing adsorption process to separate carbon oxides and nitrogen therefrom,
  said pressure swing adsorption process being conducted such that, in the adsorption stage, adsorption is continued so that nitrogen break-through into the unadsorbed, hydrogen containing, product stream occurs, whereby the product gas stream contains at least 50% by volume of hydrogen and 0.5 to 40% by volume of nitrogen.

The reaction of the feedstock with the oxygen/nitrogen mixture can be conducted in a variety of ways. Most conveniently it is an air mode variant of one of the processes usually operated using high strength oxygen as the gasifying agent. Examples of such processes are believed to be available under licence from the following companies: Shell and Texaco (both using heavy oil feedstock), Koppers-Totzek, Prenflo, Shell-Koppers, Lurgi, BGC/Lurgi, Texaco, Foster-Wheeler, Winkler, U-gas, and Westinghouse (all coal feedstock). Other variants of such processes using, for example oil shale, biomass, or various waste material such as tyres, may be used. The feedstock preferably has a hydrogen to carbon atomic ratio in the range 0.4 to 1.9 on an anhydrous basis.

Such partial oxidation processes are normally non-catalytic and operate at temperatures in the range 550° to 2000° C. and pressures up to 100 bar abs., depending on the design of the reactor. The pressure is preferably higher than the PSA inlet pressure by up to 10 bar (as for example in the Lurgi, Texaco, Shell, or Shell-Koppers processes). Alternatively, if the pressure employed in the partial oxidation step is lower than the PSA inlet pressure, the crude, or shifted, gas may be compressed, preferably after a preliminary purification.

The reaction of the feedstock and oxygen/nitrogen mixture is preferably effected under conditions and reactant proportions to give a crude gas having a hydrogen plus carbon monoxide content of at least 30% by volume and a nitrogen content of 30 to 60% by volume, both on a dry basis, in order to avoid producing excessive quantities of PSA waste gas. The crude gas preferably has a total carbon oxides, i.e. carbon monoxide plus carbon dioxide, content of 10 to 30% by volume on a dry basis. Thermodynamic data permitting calculation of temperatures, pressures, and reactant proportions required to give a crude gas stream of the desired composition are readily available to chemical engineers.

The oxygen/nitrogen mixture employed in the reaction of the feedstock is preferably air, but may be moderately oxygen enriched air having an oxygen content of up to 35% by volume, or it may be oxygen depleted air having an oxygen content above 15% by volume.

After the reaction between the feedstock and oxygen/nitrogen mixture, the crude gas is subjected to catalytic shift with steam to convert carbon monoxide to carbon dioxide with the concurrent production of more hydrogen. Minor impurities in the crude gas, for example dust, carbon, tar, hydrogen cyanide, nitrogen oxides, and sulphur compounds, are desirably removed, before or, less preferably, after, the shift reaction. Such preliminary purification may be effected by conventional techniques.

The catalytic shift can be carried out in either of two broad ways. First, if thorough removal of sulphur and any other catalyst poisons is effected prior to shift, for example by contacting the crude gas with methanol at a temperature below −10° C., the following ways are suitable:

"high temperature", using an inlet temperature in the range 330° to 400° C., an outlet temperature in the range 400° to 500° C., usually over an iron oxide/chromia catalyst, and affording in a single stage an outlet carbon monoxide content in the range 2 to 4% by volume on a dry basis;

"low temperature", using an inlet temperature in the range 190° to 230° C., an outlet temperature in the range 250° to 300° C., usually over a catalyst comprising metallic copper, zinc oxide, and one or more other difficulty reducible oxides such as alumina or chromia, and affording an outlet carbon monoxide content in the range 0.1 to 1.0, especially under 0.5, % by volume on a dry basis;

"combination", using the sequence of high temperature shift, cooling by indirect heat exchange, and low temperature shift; if desired, either shift stage can be subdivided with interbed cooling.

"medium temperature" in which the inlet temperature is in the range 250° to 325° C. and the outlet temperature is up to 400° C.: a suitably formulated supported copper catalyst can be used, and the outlet carbon monoxide content is typically up to 2% by volume on a dry basis.

Second, if there is no sulphur removal before the shift stage, or if there is a treatment, for example with an absorbent liquid, that removes some of the sulphur compounds, e.g. hydrogen sulphide, but only effects incomplete removal of other sulphur compounds, e.g. carbonyl sulphide, then sulfactive otherwise, known as "dirty", shift may be employed, wherein the crude gas is contacted with a cobalt-molybdenum sulphide catalyst. The temperature at the inlet is typically in the range 200° to 350° C. and at the outlet 50° to 100° C. higher. The outlet carbon monoxide content is typically 0.5 to 4% by volume on a dry basis.

The above inlet and outlet temperatures refer to adiabatic shift catalyst beds. However, in the interest of energy recovery, catalytic shift is preferably operated in indirect heat exchange with a coolant, especially water under pressure. Thus the catalyst can be disposed in tubes surrounded by water, or vice versa. Details of such a shift stage are given in EP-A-157480. If the crude gas has been cooled to purify it before shift, the temperature in the shift stage preferably rises from the inlet to the outlet.

Whichever form of shift stage is employed, the high nitrogen content of the crude gas leaving the partial oxidation reaction makes it possible to add most, if not all, of the steam required in the shift stage by direct contact with hot water.

After shift the gas is cooled, possibly by indirect heat exchange, but preferably, at least in part, by direct contact with water so as to produce a hot water stream suitable for saturating the crude gas fed to the shift stage. After leaving such a direct contacting with water to effect some cooling, the shift gas is then cooled by indirect heat exchange to below the dew point of steam to condense any excess of steam as water; this water is then separated, leaving the raw gas ready for feeding to the PSA stage.

If the sulfactive form of shift is used, the gas is preferably desulphurised before it is subject to the PSA waste gas.

The raw gas fed to the PSA stage may contain up to a few percent of water vapour by volume, depending on the ability of the PSA stage to handle it, for example as a result of including a silica gel water adsorption section. Generally however the water vapour content of the raw gas should be under 1% by volume.

The volume ratio of hydrogen to the sum of nitrogen and carbon monoxide in the raw gas is preferably in the range 0.6 to 1.4. The nitrogen to carbon monoxide volume ratio is preferably at least 20, and may be as high as 200. Still higher ratios could be used, but it is more costly to attain them. The carbon monoxide content is typically under 4, especially under 1, more especially under 0.5, % by volume on a dry basis. These carbon monoxide contents will of course correspond to the extent to which the raw gas has been subjected to the shift reaction.

By the process of the invention it is readily practicable, using an easily attainable nitrogen to carbon monoxide ratio in the raw gas, to obtain a hydrogen product stream having a carbon monoxide content under 1000, especially under 100, ppm by volume without using in the PSA system a moecular sieve having substantially more affinity for carbon monoxide than nitrogen.

The raw gas may, and generally will, contain methane; however the proportion thereof is preferably under 2% by volume on a dry basis, since higher levels represent non-utilised feedstock and lead to a waste gas calorific value unnecessarily high for an energy balanced process.

Since the nitrogen in the raw gas results from the use of air, or oxygen enriched or depleted air, in the production of the raw gas, the latter will also contain inert gases such as argon. Some or all of the methane and such inert gases will be removed in the PSA stage but anyway their presence as impurities in the product hydrogen stream can normally be tolerated.

The raw gas will also contain carbon dioxide in addition to carbon monoxide. The amount of carbon dioxide in the raw gas is typically in the range 10 to 30% by volume on a dry basis. The volume ratio of the sum of nitrogen and carbon monoxide to carbon dioxide is suitably in the range 1 to 5, especially 1.3 to 4. In some cases it may be desirable to remove partially carbon dioxide, for example to a content of 1 to 5% by volume, from the shifted gas stream by a conventional wet process prior to the PSA stage. In such cases the nitrogen plus carbon monoxide to carbon dioxide volume ratio in the raw gas will be correspondingly greater. The carbon dioxide will be essentially totally removed in the PSA stage.

The PSA system can broadly be of the types described in U.S. Pat. No. 3,430,418, U.S. Pat. No. 3,564,816, U.S. Pat. No. 3,986,849, EP-A-157480, EP-A-178833, and EP-A-183358. In the PSA system it is preferred that each bed takes part successively in the steps of:
- adsorption
- co-current pressure equalisation (preferably multiple)
- co-current partial depressurisation (optional)
- counter-current depressurisation
- purge (optional)
- re-pressurisation.

In the PSA system at least 4 beds are preferably used. In particular there are preferably at least 5 beds in order to provide for multiple pressure equalisations and thus increase the hydrogen product recovery. More preferably at least 10 beds are used.

In the ensuing definition of the special characteristics of the preferred PSA stage, the terms "inlet" and "outlet" refer to the direction of flow of gas during the adsorption step, and the terms "counter-current" and "co-current" mean towards such inlet and outlet respectively.

The preferred PSA stage differs from those previously proposed in the compositions of the raw and product gases and in the detailed operations appropriate thereto.

In the preferred PSA system the pressure of the raw gas entering a bed undergoing adsorption duty is preferably in the range 25 to 50, especially 30 to 40, bar abs.

In the adsorption step the raw gas is fed to the inlet of the bed in question and product gas is taken from the bed outlet. Within the bed during this step, gases more readily adsorbed than hydrogen are adsorbed onto the adsorbent. The most readily adsorbed components, water vapour and carbon dioxide, will be adsorbed in that portion of the bed nearest the inlet until the adsorbent is saturated with these components whereupon the adsorption front moves towards the bed outlet. The adsorption step is terminated before the carbon dioxide adsorption front reaches the bed outlet. Components of intermediate adsorbability, viz methane, nitrogen, carbon monoxide, and argon, are also adsorbed in the bed but their adsorption fronts will generally be nearer to the bed outlet than those of carbon dioxide and water vapour.

In the process of the invention the adsorption step is continued until the nitrogen adsorption front has reached the outlet of the bed, i.e. so that nitrogen "break-through" occurs; in this way the composition of the unadsorbed product varies significantly with time. Integrated over the whole of the adsorption step, the unadsorbed product has a nitrogen content of 0.5 to 40% by volume, in particular 1 to 10% when making hydrogenating gas and 20 to 40, especially 24 to 30, % by volume when making ammonia synthesis gas. In contrast, in conventional PSA processes used for the production of technical hydrogen, the unadsorbed product contains typically over 99.99% by volume of hydrogen and there is essentially no variation in the composition of the unadsorbed product during the adsorption step. In the present invention, the hydrogen content of the unadsorbed product is often relatively low at the start of the adsorption step because, in the preferred mode of operation, the bed has previously been purged counter-currently with a nitrogen-containing gas and repressurised counter-currently with the product gas stream and thus carries a relatively high loading of nitrogen at its outlet end: on commencement of adsorption, this nitrogen at the outlet end of the bed is swept into the unadsorbed product stream. On continuing adsorption the unadsorbed product becomes essentially only hydrogen until nitrogen break-through occurs. This nitrogen break-through is allowed to continue until the nitrogen content of the unadsorbed product, integrated over the whole of the adsorption step, is at the desired level.

In order to even out the composition of the unadsorbed product, it is preferred to use a buffer vessel into which the unadsorbed product is fed, and/or to use a PSA system having a plurality of beds on adsorption duty at any one time but out of phase with one another.

At the end of the adsorption step the bed contains three zones:
(a) a zone containing mainly carbon dioxide as adsorbate;
(b) a zone containing some carbon dioxide but partly loaded with carbon monoxide and nitrogen (and with methane and argon if these are present in the raw gas);
(c) a zone containing very little carbon dioxide but loaded with carbon monoxide and nitrogen at a level decreasing from the zone boundary towards the bed outlet.

Zone (c) may also contain methane and argon if these are present in the raw gas. The main function of this zone is to remove carbon monoxide (and methane if present) substantially totally and to remove nitrogen (and some of the argon) so that the unadsorbed product, integrated over the adsorption step, has the desired purity. If methane is present in the gas leaving zone (b), it is removed substantially totally in zone (c). At the end of the adsorption step, zone (c) is still long enough to remain within the bed, i.e. so that essentially no carbon monoxide, or methane, leaves the bed, during a subsequent co-current flow pressure equalisation and co-current depressurisation providing a purge gas.

In the preferred PSA system, after the adsorption step has proceeded to the desired extent in a particular bed, the pressure in that bed is reduced by one or more pressure equalisation steps in which gas from the outlet of the bed that has finished its adsorption duty is released co-currently through the bed outlet and is fed, preferably counter-currently, into a recipient bed that has been depressurised and may have been partly repressurised. This allows unadsorbed gas that is still within the adsorber, at the end of the adsorption step, as void space gas and is at the adsorption pressure, to be recovered. This pressure equalisation step causes the adsorption fronts of all three zones (a), (b), and (c) to move towards the bed outlet but, as mentioned above, zone (c) remains substantial in length.

There may be one or more pressure equalisation steps as described in the aforementioned references.

After the pressure equalisation step, or steps, the bed is subjected to depressurisation. Where there is a purge step in the PSA cycle, this depressurisation may first be co-current to an intermediate pressure level to provide a purge stream for feeding to another bed, and in this case the co-current depressurisation may be between pressure equalisation steps. Such a co-current depressurisation further advances the main fronts of all three zones, and also a tail of each zone, towards the outlet of the bed, but zone (c) remains substantial in length, so that the gas leaving the outlet is carbon dioxide free. However the gas leaving the outlet during such a co-current depressurisation is relatively rich in nitrogen, since the hydrogen in the adsorber at the end of the adsorption cycle has largely been transferred to another bed during the pressure equalisation step, or steps, and nitrogen in zone (c) is desorbed as a result of the reduction in pressure and displacement by the advance of carbon dioxide.

After pressure equalisation and after any co-current depressurisation, the bed is then subjected to a counter-current depressurisation wherein the pressure in the bed is reduced to the lowest level by releasing gas from the inlet end. This step effects desorption of most of the adsorbed gas from the adsorbent thereby producing a waste gas stream. The level to which the pressure is reduced in the counter-current depressurisation may be atmospheric but can, if desired, be higher, or lower as a result of using a vacuum pump. In a preferred process the final, lowest, pressure is over 1, especially in the range 3 to 5, bar abs. The ratio of the highest pressure, i.e. that at which the raw gas is fed to the adsorber during the adsorption step, to the lowest pressure is preferably in the range 8 to 25, particularly 10 to 15. In the counter-current depressurisation step, the fronts of all three zones move back towards the bed inlet.

After counter-current depressurisation, the bed may, in preferred forms of the process, be subjected to a purge step. In such a step, gas is fed counter-currently through the bed from a bed undergoing co-current depressurisation as described above. Such a purge moves the zones further back towards the bed inlet and further carbon dioxide and nitrogen are carried away through the bed inlet, thus effecting a purge of the bed. During such a purge step the outlet end of the bed adsorbs a significant quantity of nitrogen from the gas being used for the purge and as a result the tail of the front of zone (a) is moved back towards the bed inlet, thus decreasing the risk of trace break-through of carbon dioxide in the next adsorption cycle.

After the counter-current depressurisation step, and after any purge step, the bed is subjected to repressurisation. This is effected counter-currently so that the remaining fronts are moved towards the inlet. The gas used for repressurisation, which may be effected in more than one stage, comprises gas released from the outlet of a bed that has completed its adsorption step, i.e. in a pressure equalisation step as described above. In this step the zone nearest the bed outlet is brought towards equilibrium with the relatively nitrogen-rich gas delivered by the bed undergoing pressure equalisation. During or after the repressurisation using gas from a bed undergoing pressure equalisation, the bed is repressurised, counter-currently, with part of the unadsorbed product stream from a bed undergoing its adsorption step. This feed of product gas to the outlet of the bed undergoing repressurisation preferably takes place throughout the feed of gas from the bed undergoing pressure equalisation as well as after that feed has ceased, so that the flow rate of the product gas from the PSA system as a whole does not vary much with time. Alternatively, or additionally, the product gas feed for repressurisation may be from a product gas reservoir. If desired, nitrogen-rich product gas from the beginning, or the end, of an adsorption step can be used for the repressurisation, rather than using integrated product gas. At the end of repressurisation the bed is ready to return to adsorption duty.

As will be described below, in some cases it is desirable to separate carbon dioxide from the waste gas from the PSA system before the waste gas is used. It is also possible to operate the PSA system to give two waste gas streams, one rich in carbon dioxide, and the other carbon dioxide-lean and containing the bulk of the combustible components, viz carbon monoxide, methane, and hydrogen, separated from the raw gas by the PSA stage. A PSA process giving carbon dioxide-rich and carbon dioxide-lean waste gas streams is described in the aforesaid EP-A-178833 and involves two depressurisation-to-waste stages, the first, preferebly co-current, to an intermediate depressurisation pressure and giving the carbon dioxide-lean waste gas and the second, preferably counter-current, to the final, lowest, pressure and giving the carbon dioxide-rich waste gas. Thus where, as is described below, it is desirable to remove carbon dioxide from the waste gas prior to combustion thereof, such a PSA process giving two waste gas streams may be employed and only the carbon dioxide-lean waste gas is subjected to combustion. Alternatively a PSA process giving a single waste gas stream may be used and, where necessary, carbon dioxide is removed therefrom, as described below, prior to combustion.

The adsorbent used in the PSA stage can be chosen from among available materials including varieties of active carbon, zeolites, and silica gel, in respect of which gas adsorption data are published or are available from companies specialising in adsorption. Among the zeolites, those of pore diameter of 5 Å and less, for example calcium zeolite A, are generally useful in view of the small size of the molecules involved. Molecular sieves providing substantially increased adsorption of carbon monoxide relative to nitrogen, for example by a factor of more than ten, such as mordenite of NaCaX, appear to be potentially of value in the present invention but are not normally needed.

In a preferred form of the invention the PSA waste gas is further processed to recover its fuel value. This is preferably effected by combustion and expansion of the combustion products in a turbine, especially driving one or more machines associated with the process. In particular, when the methane plus carbon monoxide content of the raw gas is not over 2% by volume on a dry basis, the power output of such a turbine can be approximately equal to the power requirement of the compressor for the oxygen/nitrogen mixture used in the partial oxidation stage. The energy content of the PSA waste gas naturally will also depend on the extent of the shift reaction employed, since that will affect the carbon monoxide content of the PSA waste gas; on the hydrogen content of the product stream, since that affects the flow rate of the waste gas relative to the product; and on the waste gas pressure. If a greater power output is required from combustion of the waste gas, for example in order to compress the product gas, the process conditions may be adjusted, for example to give a higher waste gas fuel value. By the term "approximately equal" in relation to the power output and power requirement, we mean that the power output is within $\pm 10\%$ of the power requirement. Thus we do not exclude the possibility of a small import of fuel gas, steam, or electricity to provide additional power for the oxygen/nitrogen mixture compressor, or the export of electricity produced by a generator driven by the turbine. Indeed, it is often preferably to arrange the process conditions to provide such an export of electricity in order to provide the power for auxiliary equipment such as water pumps.

In a preferred form of the invention the PSA waste gas, and/or the air used for its combustion, is saturated by contact with a hot water stream prior to the combustion.

The PSA waste gas has a relatively low calorific value, typically below 300 BTU/scf, i.e. 11 MJ.m$^{-3}$, and, especially where carbon dioxide is not removed therefrom before combustion, may be as low as 20 to 100 BUT/scf, i.e. 0.75 to 3.7 MJ.m$^{-3}$. Combustion of such low calorific value fuels is advantageously effected catalytically. Thus combustion may be effected by passing a mixture of the PSA waste gas and air (one or both of which is preferably saturated with water vapour) over a catalyst such as a supported platinum group metal. In some cases it may be desirable to remove the carbon dioxide from the waste gas prior to combustion. This may be achieved by a wet carbon dioxide removal process, which may also serve to effect saturation of the gas fed to combustion. Prior to wet carbon dioxide removal and/or combustion, it may be necessary to compress the PSA waste gas. Also the air employed for the combustion will normally require compression. The compressors required for such compressions are conveniently powered by the turbine driven by the waste gas combustion products. The overall process conditions are preferably selected so that the combustion of the PSA waste gas provides that there is approximate equality, as aforesaid, between the power required for compression of the oxygen/nitrogen mixture used in the partial oxidation stage and the new power obtained by the combustion of the PSA waste gas, i.e. after providing for such compression, if any, of the PSA waste gas and the combustion air. As mentioned above, saturation of the PSA waste gas and/or combustion air is desirable. This saturation may be effected with hot water heated by heat exchange with the combustion products after passage through the turbine.

As mentioned above, in one form of the PSA process, a carbon dioxide-lean waste gas stream at an intermediate pressure can be produced. This may be used directly for combustion thus avoiding the need for compression of the waste gas prior to combustion and/or for carbon dioxide removal therefrom.

Alternatively, or additionally, the fuel value of the PSA waste gas may be utilised in preheating air, steam, or hydrocarbon feedstock used in the crude gas generation steps.

The invention is illustrated by the accompanying drawing, FIG. 1 which is a flow sheet of a combination process including initial reaction of coal with air, shift with heat recovery, PSA separation of the raw gas to give a hydrogen product stream (namely ammonia synthesis gas) and a waste gas stream and power recovery from the and waste gas by way of catalytic combustion.

In this process powdered coal and a current of air at a pressure of about 10 bar abs., are fed, via lines 10 and 12 respectively into a fluidised bed gasifier 14 operating at about 1000° C. where partial oxidation takes place. Powdered ash is removed from gasifier 14 via line 16 and the crude gas, which contains carbon monoxide, hydrogen, methane, and nitrogen, is cooled by raising steam in a boiler 18. The crude gas is cooled further, by means not shown, scrubbed of solids in scrubber 20 and compressed to 25 to 50, e.g. 30, bar abs. in a compressor 22. The compressed gas is then passed to a column 24 wherein it is contacted with cold methanol to remove carbon dioxide, carbonyl sulphide, hydrogen sulphide, and other sulphur compounds. The methanol is regenerated in a second column 26 from which an overhead waste stream is fed to a sulphur recovery plant (not shown). The purified crude gas leaving column 24, via line 28, to the upper (saturator) section 30 of a tower 32.

Here the crude gas contacts a hot water stream, fed to the saturator via line 34, flowing down the packing in the upper section 30. The saturated gas leaves the saturator via line 36 and then is optionally mixed with more steam supplied via line 38.

The resultant warm steam/gas mixture, which typically has a steam/gas volume ratio of 0.3 to 0.6, a temperature of 150° to 250° C., and a pressure of 25 to 50 bar abs., is then preheated in a heat exchanger 40 and fed to a water-cooled shift reactor 42 in which the shift catalyst (supported copper) is disposed in tubes surrounded by water in a pressure shell. In shift reactor 42 the shift reaction is brought substantially to equilibrium at a temperature controlled at typically in the range 230° to 280° C. giving an outlet carbon monoxide content in the range 0.1 to 1% by volume on a dry basis. The shift outlet temperature is preferably 10° to 30° C. higher than the inlet temperature.

The shifted gas is then cooled in heat exchangers 40 and 44, passed into the lower packed de-saturation zone 46 of tower 32 where it contacts cool water fed in via line 48. The resulting water-depleted gas stream leaves desaturator 46 via line 50 and is cooled in cooler 52 to below the dew point of steam and passed into catchpot 54. Here liquid water is separated and removed via line 56 and dry gas is taken overhead and passed to a PSA system 58.

PSA system 58 includes beds of adsorbent material such as active carbon or a molecular sieve on which carbon dioxide is strongly adsorbed, hydrogen is very weakly, if at all, adsorbed, and nitrogen, carbon monoxide, methane, and argon, are at least partly adsorbed. The PSA system includes beds under regeneration, i.e. being purged and repressurised, and undergoing treatments such as pressure equalisation and depressurisation as hereinbefore described, and the necessary changeover valves. From the PSA system an ammonia synthesis gas product stream is passed out via line 60 to a methantor and ammonia synthesis plant (not shown). Also a PSA waste gas stream is passed out via line 62.

The PSA waste gas, which contains nitrogen, carbon dioxide, carbon monoxide, methane, argon, and some hydrogen, is fed via line 62 to a compressor 64 (unless its pressure is already high enough) and then, via line 66, which may include a saturator (not shown), to a catalytic combustor 68 feeding hot gas to a gas turbine 70. The turbine 70 provides shaft power for an air compressor 72 supplying air to gasifier 14 via line 12 to combustor 68 via line 74. Turbine 70 also provides shaft power for compressors 22 and 64. Additional power is provided by an electric motor 76.

The water system of the process receives cold condensate as the bottoms of catchpot 54 via line 56 and make up water via line 80. This mixture is fed via pump 82 and line 84 into a cool water stream which is then fed via line 48 into the lower (desaturator) packed section 46 of tower 14. Here the unreacted steam in the shifted gas from shift reactor 42 condenses into the water, giving a warm water stream which is taken as bottoms, via line 86, and fed, via pump 88 and line 90, to two heating stages, viz. indirect heat exchange with shifted gas in heat exchanger 44, and then, in a heat exchanger 92, with condensing steam raised in shift reactor 42. The water stream may then still be entirely liquid or may be partly boiling and is fed, via line 34, to the saturation zone 30 in the upper section of the tower 32. The cooled water remaining after contacting the crude gas in the upper section of tower 30 is fed, via line 94 to a heat exchanger 96 where it is cooled by heat exchange with water to be fed to boiler 18 via line 98; the cooled water 390 te from a raw gas derived from the air-gasification of coal by the above flowsheet.

| Stream | Temp (°C.) | Press. (bar abs) | Flow rate (kg mol · h$^{-1}$) | | | | | |
|---|---|---|---|---|---|---|---|---|
| | | | CO | CO$_2$ | H$_2$ | CH$_4$ | N$_2$ | Ar |
| inlet | 30 | 30 | 13.8 | 1141.7 | 1610.5 | 45.0 | 1721.0 | 55.0 |
| product | 30 | 29.5 | 0.2 | * | 1464.2 | 3.9 | 488.0 | 39.0 |
| waste | 30 | 2.5 | 13.6 | 1141.7 | 146.3 | 41.1 | 1233.0 | 16.0 |

*the carbon dioxide content of the product gas is about 1 ppm by volume.

from heat exchanger 96 is then fed, via line 100, to be mixed with cold condensate fed via line 84, and fed to line 48.

The steam raised in boiler 18 is fed via line 102 to a turbine 104 driving an alternator 106 providing the power for minor machines such as pumps 70 and 82 and the circulating pump (not shown) for the methanol absorbent in columns 24 and 26. As indicated above, if desired, part of the steam raised in boiler 18 may be fed, preferably after it has been let down in turbine 104, via line 38, to the saturated crude gas leaving the upper section of tower 32. The rest of the exhaust from turbine 104 can be fed, via line 108, to a condenser (not shown) and recycled as part of the make up water supplied via line 80. Turbine 104, or electricity produced by alternator 106, may also provide at least part of the power required in the ammonia synthesis plant, e.g. for synthesis gas compression and/or circulation and/or for refrigeration.

The following variants of the above process are envisaged:

(a) A higher pressure coal gasifier is used in place of the gasifier 14. In this event compressor 22 may be unnecessary, but further compression of the gasifier feed air is necessary, e.g. by feeding part of the compressed air from compressor 72 to a further compressor and taking the gasifier air feed from this further compressor.

(b) Heavy oil feedstock is used instead of coal. In this event gasifier 14 is replaced by, for example, a Shell or Texaco gasifier.

(c) Whichever gasifier or feedstock is employed, an absorbent other than methanol can be used in column 24. For example there could be used an ethanolamine, especially methyldiethanolanine; or aqueous potassium carbonate, possibly with an activator; or a physical solvent such as "Sulpholane", N-methyl pyrrolidone, propylene carbonate, or polyethylene glycol dialkyl ether. In this event carbonyl sulphide will remain in the crude gas stream. It would be possible to remove it by a bed of zinc oxide, but, preferably, a sulphactive catalyst such as alkalised cobalt molybdate is used as the shift catalyst instead of supported copper. The shifted gas then contains hydrogen sulphide and a hydrogen sulphide removal unit such as a zinc oxide bed will be needed between catchpot 54 and PSA unit 58. If a wet carbon dioxide removal unit is employed to remove some of the carbon dioxide from the shifted gas prior to the PSA system, this may remove sufficient of the hydrogen sulphide so that it can be removed by the PSA unit 58 into the waste gas stream 62 and can be tolerated in the combustor 68 and turbine 70 and its exhaust.

The following table shows the temperatures, pressures, and flow rates for the PSA stage of a process producing synthesis gas for a daily ammonia output of 390 te from a raw gas derived from the air-gasification of coal by the above flowsheet.

The hydrogen recovery is thus about 91% and the waste gas has a calorific value of about 35 BTU/scf (1.3 MJ.m$^{-3}$), which, after catalytic combustion, provides most of the power required by compressors 22, 64, and 72.

I claim:

1. A process for the production of a gas stream containing at least 50% by volume of hydrogen comprising
   (a) subjecting a carbonaceous feedstock having a hydrogen to carbon atomic ratio, on an anhydrous basis, of less than 2.2 to partial oxidation with an oxygen/nitrogen mixture containing 15 to 35% oxygen and selected from air, oxygen depleted air, and oxygen enriched air, so as to produce a crude gas containing hydrogen, carbon oxides, and nitrogen;
   (b) removing sulphur compounds from the crude gas;
   (c) subjecting the crude gas, in admixture with steam, and after removal of the sulphur compounds, to a single stage of catalytic shift reaction controlled at 230° to 280° C. using a supported copper catalyst to convert carbon monoxide to carbon dioxide; the proportions of the reactants, and the process conditions, in the partial oxidation and shift stages being such that the resultant shifted gas stream has
      a carbon monoxide content below 1% by volume on a dry basis,
      a nitrogen content at least 10 times the carbon monoxide content by volume, and
      a volume ratio of hydrogen to nitrogen, plus carbon monoxide, in the range 0.5 to 1.5;
   (d) cooling the shifted gas stream to condense any excess of steam to produce a raw gas stream; and
   (e) subjecting the raw gas stream to a pressure swing adsorption process to separate carbon oxides and nitrogen therefrom,
   said pressure swing adsorption process being conducted such that, in the adsorption stage, adsorption is continued so that nitrogen break-through into the unadsorbed, hydrogen containing, product stream occurs, whereby the product gas stream contains at least 50% by volume of hydrogen and 0.5 to 40% by volume of nitrogen.

2. A proces according to claim 1 wherein the carbonaceous feedstock has a hydrogen to carbon atomic ratio, on an anhydrous basis, in the range 0.4 to 1.8.

3. A process according to claim 2 wherein the carbonaceous feedstock is coal or heavy oil.

4. A process according to claim 1 wherein the oxygen/nitrogen mixture is air.

5. A process according to claim 1 wherein the reactant proportions and process conditions in the partial oxidation stage are such that the crude gas has a combined hydrogen and carbon monoxide content of at least 30% by volume, and a nitrogen content in the range 30 to 60% by volume.

6. A process according to claim 1 wherein the reactant proportions and process conditions in the partial oxidation stage are such that the crude gas has a combined carbon oxides content of 10 to 30% by volume.

7. A process according to claim 1 wherein the reactant proportions and process conditions in the partial oxidation and shift stages are such that the raw gas has a hydrogen to nitrogen, plus carbon monoxide, volume ratio in the range 0.6 to 1.4.

8. A process according to claim 1 wherein the pressure swing adsorption stage is operated at an adsorber inlet pressure in the range 25 to 50 bar abs., the waste gas from the pressure swing adsorption is catalytically combusted, and the combustion products thereof drive a turbine providing power for compression of the oxygen/nitrogen mixture, and/or the crude gas, to a pressure above the pressure swing adsorption adsorber inlet pressure.

9. A process according to claim 1 wherein the shift reaction is effected in heat exchange with a stream of a coolant thereby producing a stream of heated coolant, and at least part of the steam required in the crude gas subjected to the shift reaction is obtained by contacting the crude gas with a stream of hot water heated by heat exchange with said heated coolant.

10. A process according to claim 9 wherein the shifted gas stream is cooled by contact with a stream of water, thereby producing a heated water stream which is then heated by heat exchange with the heated coolant to produce the hot water stream.

* * * * *